Figure 1:
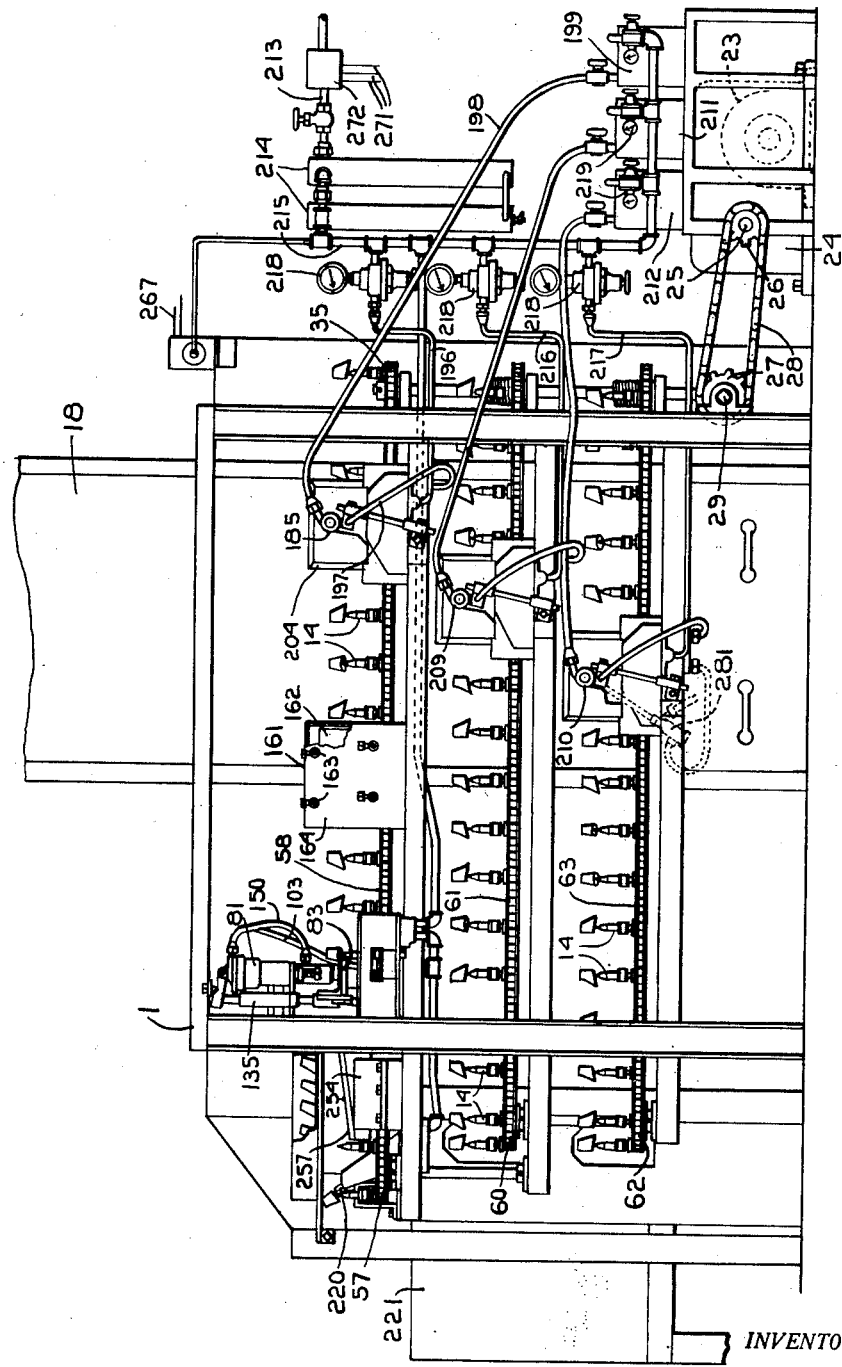

Nov. 10, 1936.     A. M. SOSA     2,060,131
SPRAY COATING MACHINE
Filed Nov. 29, 1935     8 Sheets-Sheet 1

INVENTOR.
Augustus M. Sosa
BY
CBStevens
ATTORNEY.

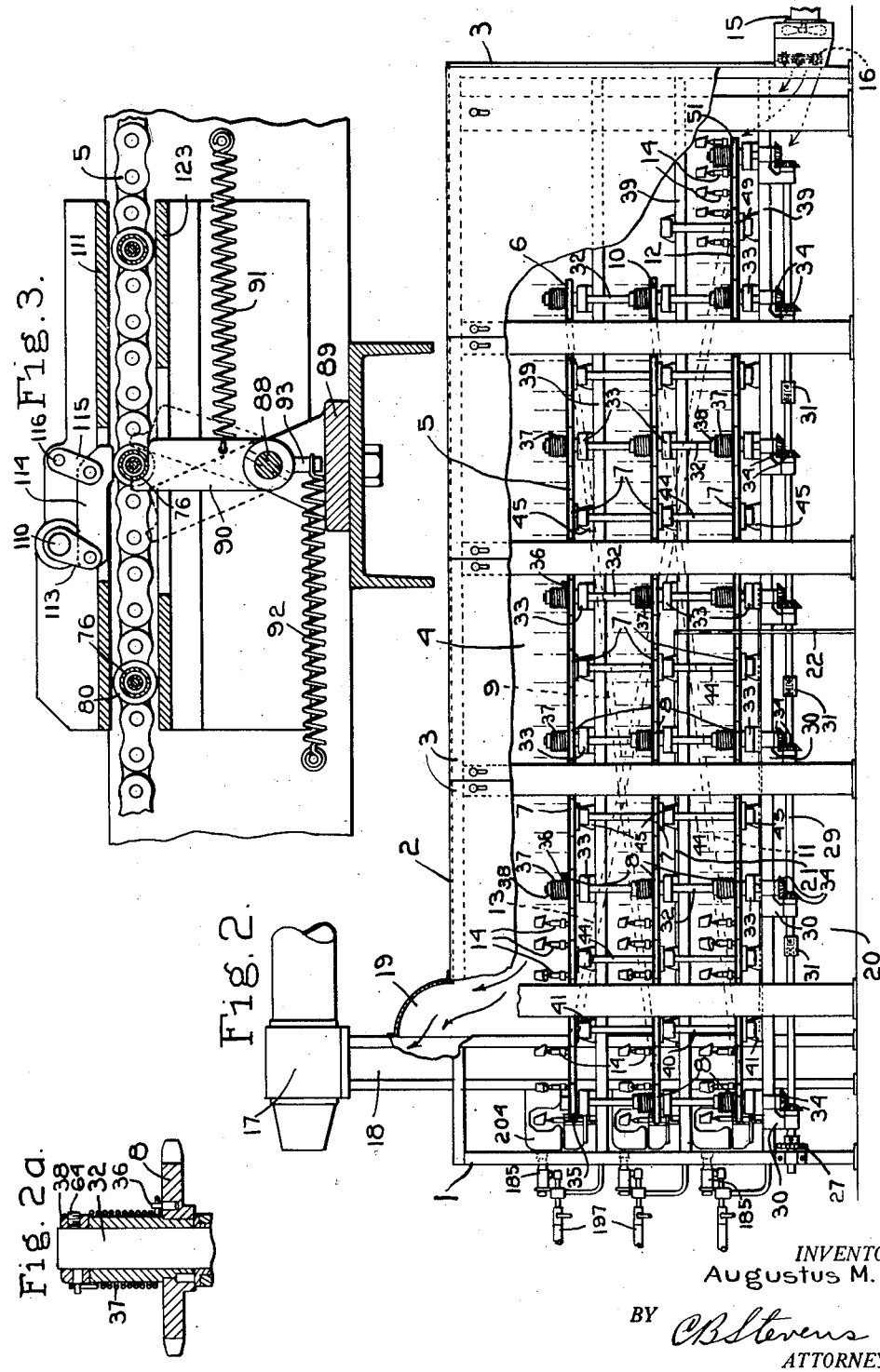

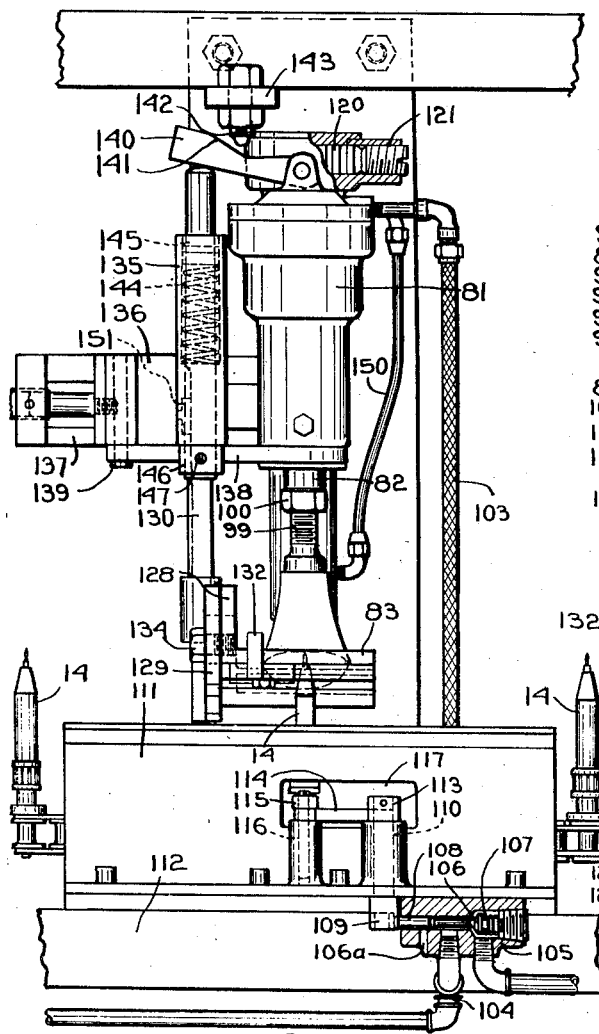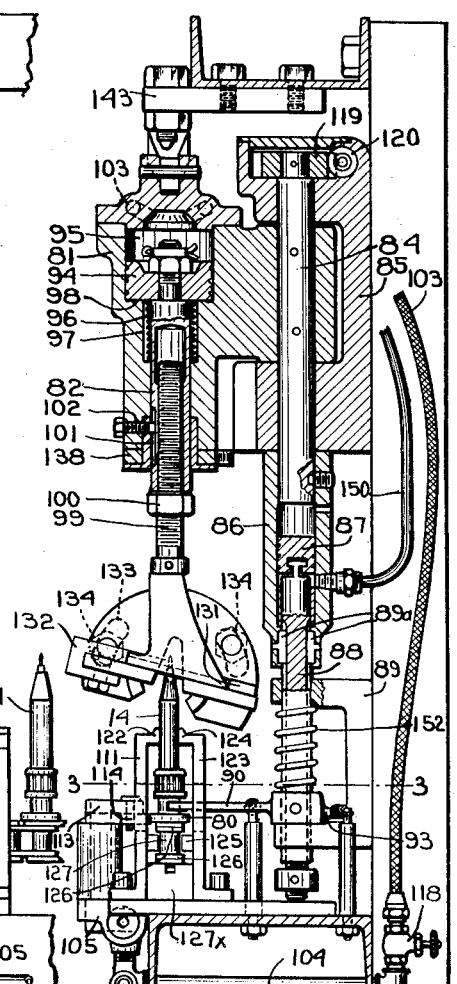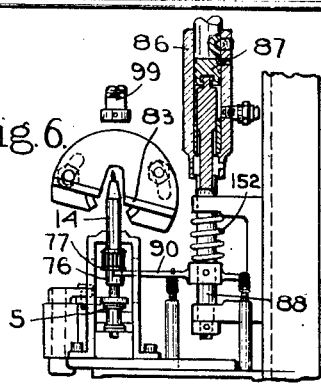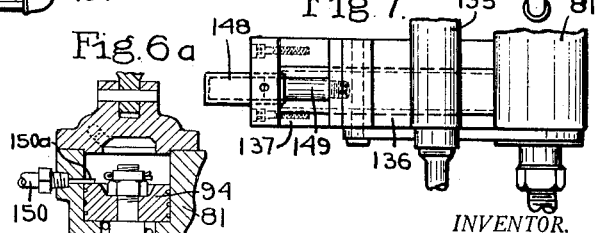

Nov. 10, 1936.  A. M. SOSA  2,060,131
SPRAY COATING MACHINE
Filed Nov. 29, 1935  8 Sheets-Sheet 4
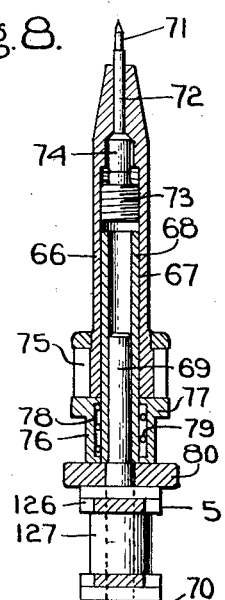
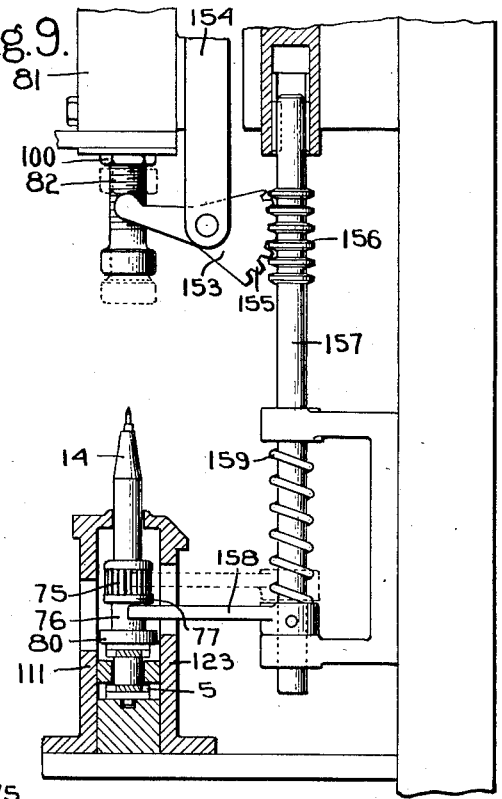
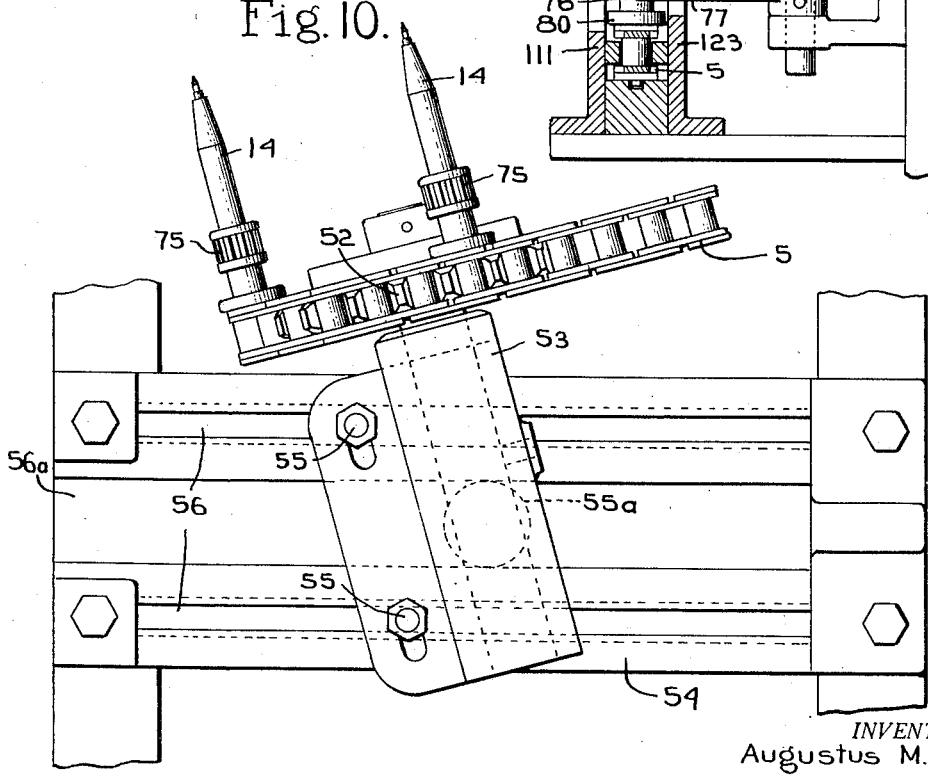
INVENTOR.
Augustus M. Sosa
BY C B Stevens
ATTORNEY.

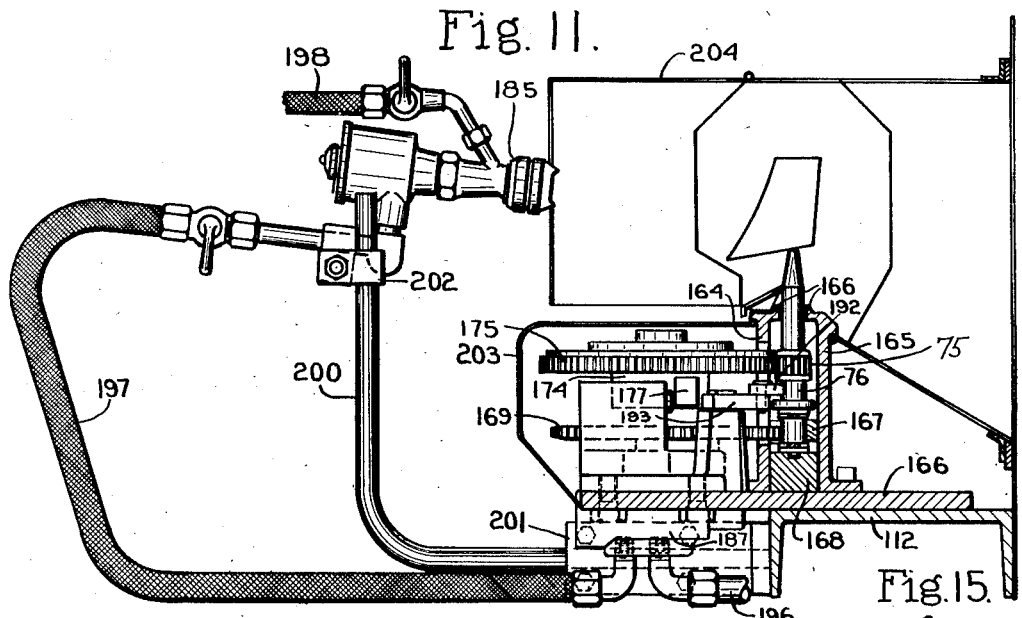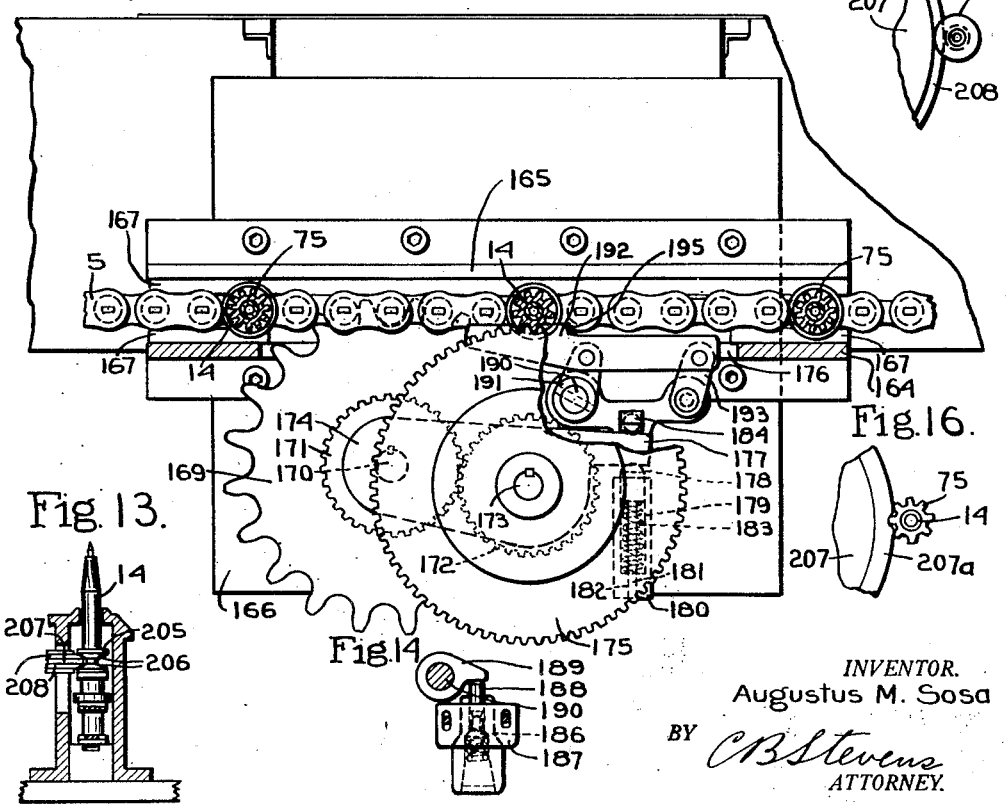

Nov. 10, 1936.  A. M. SOSA  2,060,131
SPRAY COATING MACHINE
Filed Nov. 29, 1935  8 Sheets-Sheet 6
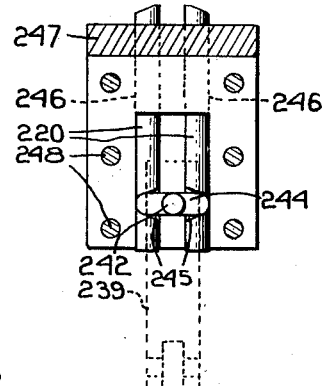
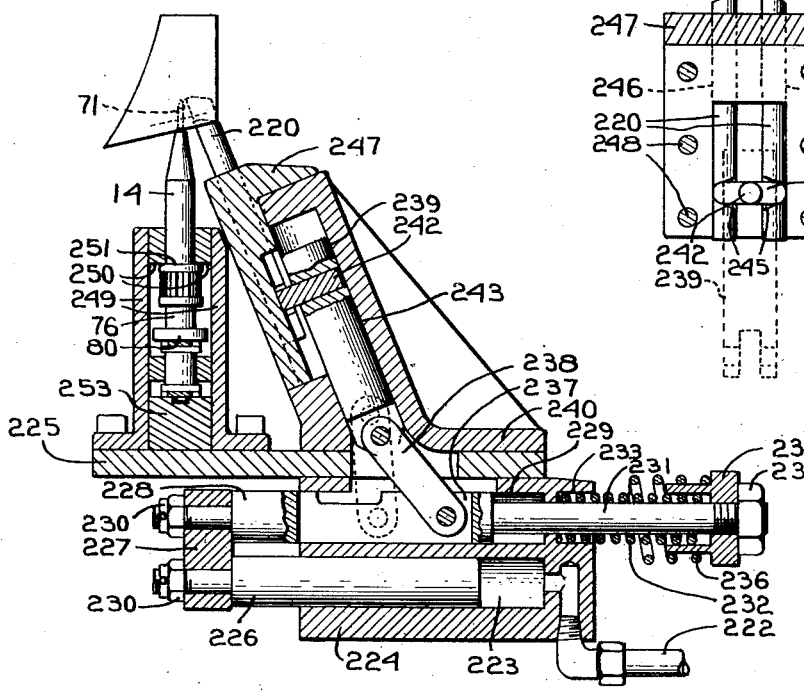
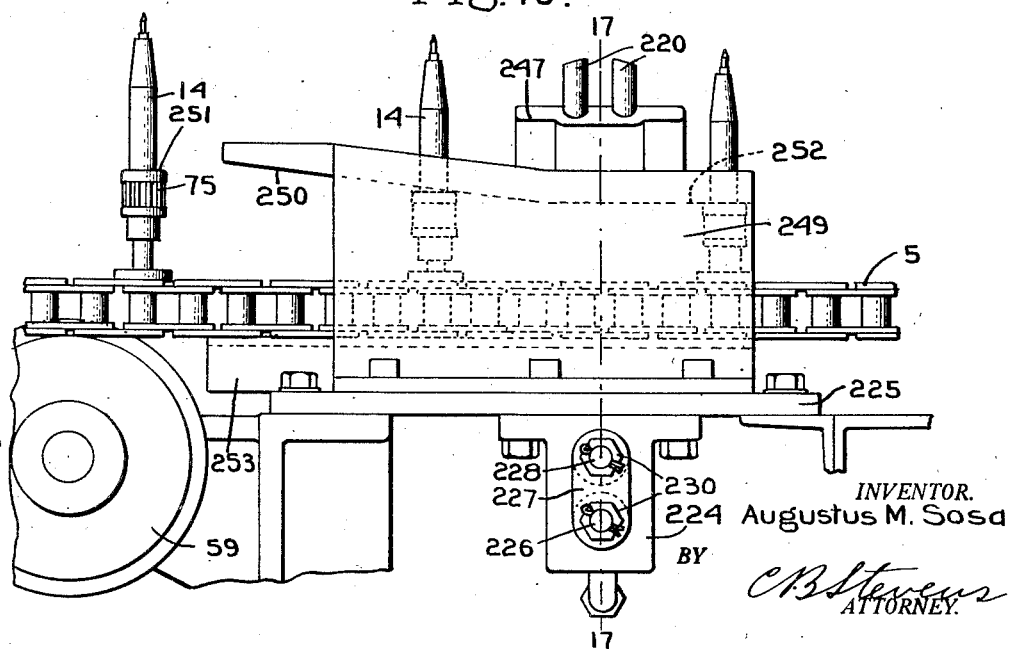
INVENTOR.
Augustus M. Sosa
BY
*C B Stevens*
ATTORNEY.

Nov. 10, 1936.  A. M. SOSA  2,060,131
SPRAY COATING MACHINE
Filed Nov. 29, 1935  8 Sheets-Sheet 7
Fig. 20.
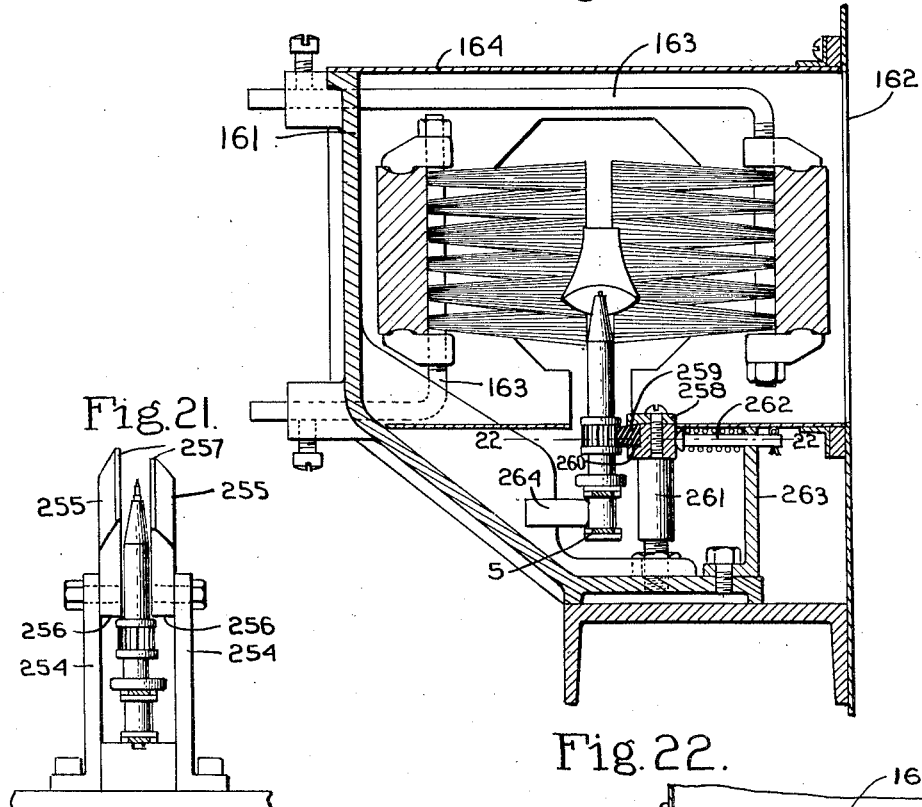
Fig. 21.
Fig. 22.
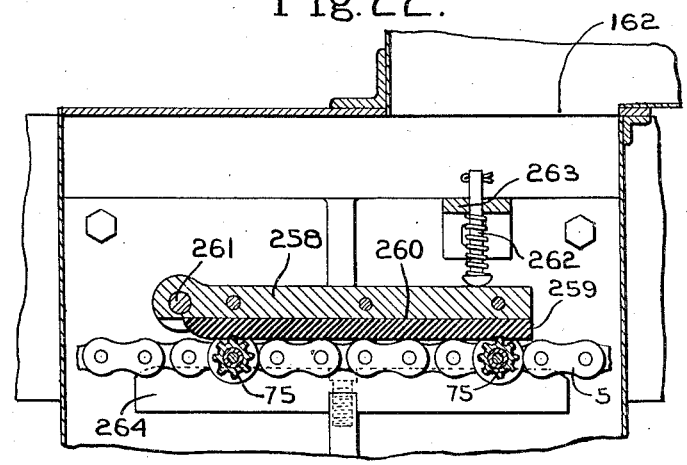
INVENTOR.
Augustus M. Sosa
BY
ATTORNEY.

Nov. 10, 1936.  A. M. SOSA  2,060,131
SPRAY COATING MACHINE
Filed Nov. 29, 1935  8 Sheets-Sheet 8

INVENTOR.
Augustus M. Sosa
BY
ATTORNEY.

Patented Nov. 10, 1936

2,060,131

UNITED STATES PATENT OFFICE 2,060,131

SPRAY COATING MACHINE

Augustus M. Sosa, Portsmouth, Ohio, assignor to Vulcan Corporation, Portsmouth, Ohio Application November 29, 1935, Serial No. 52,223

36 Claims. (Cl. 91—45)

This invention relates to machines for rapidly and automatically spray coating articles such as heels for women's shoes.

One object of the invention is to provide a spray coating machine which will automatically coat articles fed thereto at a high rate of speed with a high quality of finish.

A further object of the invention is to provide a spray coating machine capable of continuous duty at high production speed with the attendance of one operator only.

A further object of the invention is to provide a spray coating machine in which an automatic mechanism insures that no coating material is sprayed unless an article is present at the nozzle of the spray gun.

A further object of the invention is to provide in a machine of the above suggested character having an article conveyor, a discharging means for ejecting the finished articles from the conveyor consistently within a limited area to be readily received in a container.

A further object of the invention is to provide a spray machine having a conveyor chain driven by a mechanism having a plurality of spaced driving members engaging the chain along its length, such mechanism being actuated by a single power source and driving the chain in a manner to compensate for changes in the length of the chain due to wear or stretch therein thereby to distribute substantially evenly throughout the length of the chain the total driving torque required to move the chain.

A further object of the invention is to provide a spray coating machine in which the loading and discharging means are automatically operated in timed relation to the speed of the conveyor chain.

A further object of the invention is to provide automatic means for stopping the conveyor chain when the actuating means for the discharging mechanism fails, thereby preventing articles from being carried into the loading station after they have been once treated, and thus preventing damage to the articles and to the machine.

A further object of the invention is to provide automatic means for cutting off the air supply when the heel conveyor is stopped, thereby preventing waste of spray material should the conveyor come to rest with the spray gun valve open.

A further object of the invention is to provide a spray coating machine in which the moving elements of the mechanism are protected from an accumulation of spray material.

Other objects and features of the invention will more fully appear from the following description in connection with the accompanying drawings and will be particularly pointed out in the claims.

The article conveyor means of the machine is of special construction and constitutes an important feature of the invention. The spindles or other supporting means adapted to receive and hold the heels or other articles to be spray coated, must be fed to the loading station at a predetermined rate, which is dependent upon the speed with which an operator can manipulate the heels in position to be loaded upon the conveyor. The speed of the operator, the distance between the spindles or other holding means and the length of time the articles must remain in a drying chamber to which they are led after receiving a coat of spray material, determines the length of the endless conveyor system incorporated in the machine, which, in the preferred embodiment shown, is a single run of flexible chain with its axes vertical. The length of the conveyor, as computed from these factors, is relatively great and, for this reason, it becomes impractical to drive the conveyor from a single point.

The present invention drives the conveyor chain at a plurality of points distributed along its length from a rigid drive shaft which, in turn, is driven by a source of power. One of the driving points has a positive driving connection with the conveyor while the other driving points are provided with resilient torque transmitting means which may be preloaded to deliver the required amount of torque to the conveyor. In this manner undesirable stress within the chain is avoided. If each of the driving sprockets were rigidly connected to a common driving shaft and each of the driving points were carefully adjusted and positioned to assume their proportionate share of the load due to the torque and if this condition could be maintained the chain could be smoothly and efficiently driven. However, it has been found in practice such adjustment cannot be maintained since wear and stretch within the chain changes its length and thus prevents the maintenance of such original adjustment. Due to this change in length severe stress would arise in certain portions of the chain and the torque developed at each driving point would become indeterminate and between certain driving points the chain would tighten until the weakest point in the machine upon which this excessive strain was imposed would yield and throw the whole machine out of alignment or the driving motor would stall. Such a condition is intolerable and under such conditions an excess of power is consumed and the chain is driven unevenly causing general unsatisfactory operation. The present invention as above suggested and as will more fully hereinafter appear overcomes this condition.

Another important feature of the invention is the construction, operation and function of the loading station and its relation to the operation of other parts of the apparatus. This station is provided with a ram, in this instance operated pneumatically, for impaling the articles upon pointed spindles situated upon the conveyor chain. The air that actuates the impaling ram is conducted to another cylinder and actuates another ram therein. If the operator of the machine fails to place an article in position to be impaled upon its spindle by the ram, the ram will continue to move down to the extreme low position of its stroke. The charge of air behind this ram will then increase in pressure until it reaches a point where it actuates the second ram. This ram acts to shift a valve tripping member situated upon the spindle from a normally active position into its inactive position.

Following the empty spindle to the spraying station it is found that the tripping member has been moved out of a path of the valve actuator which controls the spray gun. The valve on the spray gun therefore does not open and no spray material is ejected when an article is not present at the spraying station. Before again reaching the loading station this tripping member is automatically returned to its active position. When an article is placed in proper loading position the force of the impaling ram acting upon the article prevents the second named ram from shifting the tripping member into its inactive position in a manner to be described in detail hereinafter. When an article is present upon a spindle the tripping member engages the valve actuator at the spray gun thus causing the article to be sprayed. During the spraying operation the article is automatically rotated to present the whole area of its side faces to the spray.

The articles then pass through a drying chamber and are presented to another spray station. After receiving the second coat of spray material they are again dried and subsequently presented to a third spray station where they receive a final coat of spray material. After the final coat has been dried the articles are presented to the discharging station. The discharging station is provided with an automatically operated ram which receives its motion from a piston preferably pneumatically actuated. A connection between the ram and the piston causes the motion of the ram to be decelerated throughout its working or discharging stroke. The discharging ram engages the articles at two or more points closely adjacent the point of the spindle upon which the article is impaled. Since the surface engaged by the discharging ram is in many cases uneven, means are provided for compensating for such unevenness and equalizing the ejecting thrust at the points of contact. By thus controlling the forces acting to discharge the articles from the impaling pins, the articles are caused to be deposited within a limited area and readily received within a container.

In connection with the general operation of the machine, there are protective devices and mechanical features, which will hereinafter be described in detail.

Figure 23:
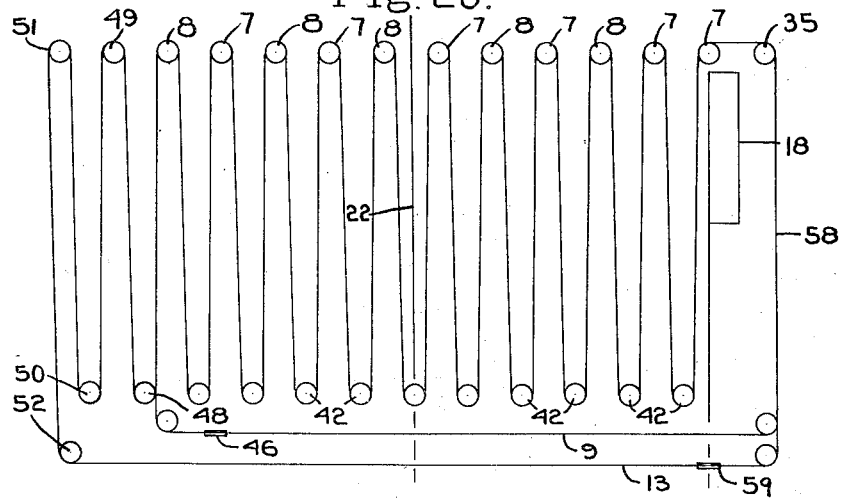
Figure 24:
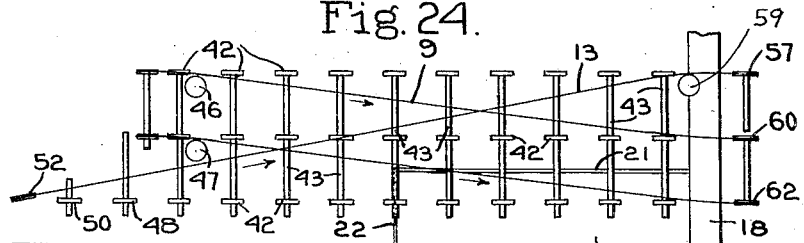
Figure 25:
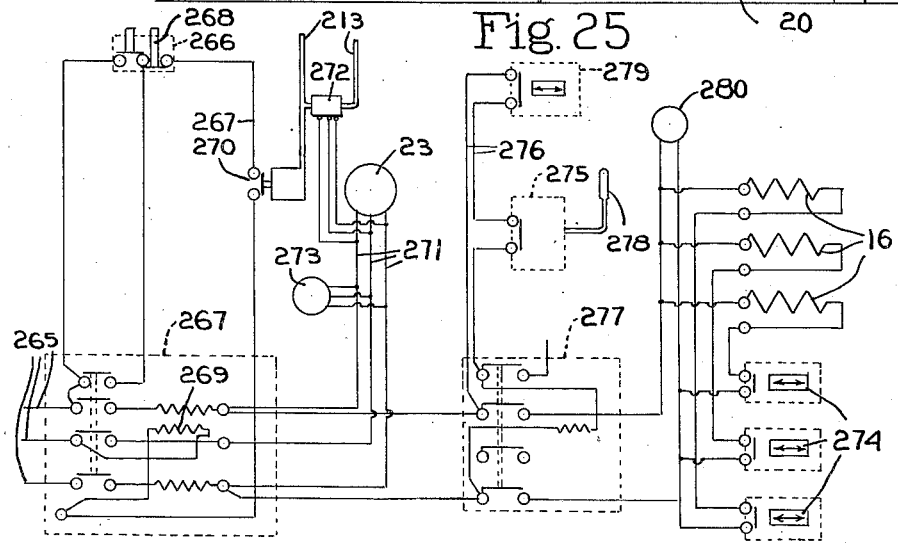

To present an accurate and more comprehensive conception of the invention, a specific embodiment thereof will be described. Such specific embodiment is illustrated in the drawings, in which:

Fig. 1 is a front elevation of the machine.
Fig. 2 is a right side elevation of the machine.
Fig. 2A is a detail view of a driving sprocket.
Fig. 3 is a detailed sectional view on line 3—3, Fig. 5.
Fig. 4 is a front elevation of the loading station.
Fig. 5 is a side elevation of the loading station with certain of the parts shown in section.
Fig. 6 is a view similar to Fig. 5 showing the parts in a different position.
Fig. 6A is a detailed view illustrating a modified construction of the main cylinder at the loading station.
Fig. 7 is a detailed view illustrating the method of cushioning the return movement of the heel impaling means.
Fig. 8 is a vertical sectional view through the heel conveying spindle.
Fig. 9 is a detailed view illustrating a modified construction of the loading station.
Fig. 10 is a view illustrating the means for taking up slack in the conveyor chain.
Fig. 11 is a side elevation of the spraying station with certain parts shown in section.
Fig. 12 is a plan view of the spindle rotating mechanism with certain parts broken away to better illustrate parts beneath.
Fig. 13 is a detailed view illustrating a modified form of drive for rotating the spindles at the spray station.
Fig. 14 is a detailed view of the spray station valve mechanism.
Fig. 15 is a plan view of the parts shown in Fig. 14.
Fig. 16 is a detailed view similar to Fig. 15 illustrating a modified form of drive for the spindles.
Fig. 17 is a cross sectional view on line 17—17, Fig. 19.
Fig. 18 is a detailed view illustrating the equalizing mechanism associated with the ejectors at the discharging station.
Fig. 19 is a front elevation of the discharging station.
Fig. 20 is a transverse cross section through the brushing station.
Fig. 21 is an end view of an auxiliary discharging station.
Fig. 22 is a cross section on line 22—22, Fig. 20.
Fig. 23 is a diagrammatic plan view illustrating the path of the conveyor chain.
Fig. 24 is a diagrammatic view of the left side elevation of the machine indicating the position of the conveyor chain and idler sprockets.
Fig. 25 is a diagrammatic illustration of the electrical connections of the driving motor and other electrical units.

The elements of the machine are supported upon a frame 1 which, with the exception of certain portions of the front end of the machine, is enclosed by an outer casing 2 which covers the sides, top and rear portion of the frame. The covering 2 desirably includes removable sections 3 along the sides and back of the machine thereby to permit access to the mechanism within. The covering 2 forms a main drying chamber 4 through which the articles are carried by a conveyor chain 5.

As shown, conveyor chain 5 carrying the articles makes three consecutive passages through the chamber 4, to dry the coats of spray material, of which there may be applied by reason of three separate spray stations provided at different levels. Then the articles may be removed from the conveyor chain and are ready for use or further processing. The chain 5, carrying a plurality of article receiving spindles, is endless, and moves from the article loading station to the first spray station and from there enters the upper portion of the chamber 4 and traverses the uppermost run of the conveyor chain, indicated by the numeral 6. The chain 5 is disposed with its axes vertical and during each passage through the chamber 4 is caused to pass in a tortuous path from side to side of the machine over groups of sprockets 7 and 8 (Fig. 3). The group 7 are idler sprockets, while the group 8 are driving sprockets.

After traversing the upper level of the chamber, the chain passes from the rear end of the machine, forward and downward along the angular path 9 from where it is conducted across the front end of the machine and passes a second spray station to receive a second coat of spray material, whereupon the articles are carried by the chain through the second or intermediate run of the conveyor, indicated at 10 (Fig. 2). After traversing the chamber, the chain bearing the articles is conducted forwardly and downward along the angular path 11. At the front end of the machine, the chain again traverses the width of the chamber 4 and passes a third spray station, whereupon the articles are then carried through the bottom level 12 of the drying chamber, and after this final passage through the chamber, the conveyor extends forward and upward along the angular path 13 and thus again reaches the starting point. The conveyor chain, as shown, is provided with a plurality of spindles 14 having a pointed upper portion upon which the articles are impaled.

Desirably a forced circulation of air is maintained in the chamber 4. This may be accomplished in any suitable manner and as shown in the drawings a motor driven fan unit 15 forces air into the chamber. It is desirable that the air be heated to insure thorough drying of the articles, and one method of raising the temperature of the air is to provide one or more electric heating units 16 over which the entering air stream passes. To complete the circulation of air, a suction fan 17 at the forward end of the machine is connected to a vertical exhaust conduit 18, which conduit 18 is provided with a connection 19 opening into the top of the chamber 4 through which the air is drawn from the chamber 4 and exhausted by the fan. The conduit 18 is also provided with inlet openings at each of the spray stations through which the surplus spray material from the spray guns are drawn into the conduit 18 and then exhausted by the fan. Desirably, the conduit 18 is divided by vertical partitions to form individual passages for the connection 19 and each of the spray guns.

When spraying some types of coating material such as lacquer it improves the finish to subject the coating to a cool non-drying atmosphere for a short period of time directly after the spray operation. To accomplish this result a cool air chamber 20 is formed by isolating a portion of the main drying chamber 4 by means of the partitions 21 and 22 (Fig. 2). As shown cool chamber 20 is so situated that the articles enter the chamber directly after they have received their third coating of spraying material and while passing through the cool chamber the spray material remains in its liquid state and continues to flow over the surface of the article seeking a common level which produces a flat even coating of the material. The articles then pass through the heated chamber 4 where the coating is dried.

The length of the chain 5 is determined by two factors: first, the speed with which the chain 5 must travel to present spindles at the loading station at the desired rate of speed and the other factor is the necessary period of time it takes to properly dry the sprayed articles. During the passage of the chain through the drying chamber it is led over the idler sprockets 7 and the driving sprockets 8 which direct it in a tortuous path from side to side of the machine, as shown in Fig. 23.

To drive the conveyor chain smoothly and efficiently means has been provided whereby the necessary driving torque is distributed and applied to the chain at a plurality of points throughout its length from a single source of power. As shown the speed of a motor 23 is reduced through a suitable reducing mechanism 24 (Fig. 1). The driven shaft 25 of the speed reducer has fixed thereto a sprocket 26 which in turn drives a sprocket 27 by means of a chain 28, sprocket 27 being fixed upon the end of a drive shaft 29 extending substantially the full length of the machine. To obtain the correct speed of the shaft 29 and consequently the desired speed of the chain in case the speed reducing means does not produce the desired speed with a 1 to 1 ratio the correct speed may be obtained by a proper selection of the size of the sprockets 26 and 27. Any suitable means other than that described may be employed to drive the shaft 29.

The shaft 29 is journaled in a plurality of brackets 30 secured to the main frame (Fig. 2) and is rigid with respect to its torque transmitting characteristic but preferably is provided with a plurality of universal joints 31 situated along its length. Such joints 31 permit of slight misalignment of the journals in the brackets 30 thus minimizing the otherwise difficult task of aligning the shaft in its several journals, due to the relatively great length of the shaft 29 and the main frame 1.

A plurality of vertically disposed shafts 32 are journaled in brackets 33 secured to the main frame. The shafts 32 are positively driven from the shaft 29 by pairs of beveled gears 34 and each of the shafts 32 has mounted thereon three of the driving sprockets 8 with the exception of the last two shafts at the rear end of the machine which will be described hereinafter. An upper sprocket 35 at the extreme forward end of the machine is pinned or otherwise securely fixed upon its shaft and acts positively to drive the conveyor chain 5 at the required speed, while each sprocket 8 is loosely mounted on its shaft and is provided with a pin 36 projecting upward from the top face thereof. As a driving connection for each sprocket 8 a helical spring 37 surrounds the shaft 32 and is anchored at its lower end upon the pin 36. The upper end of the spring 37 is secured to a collar 38 which is rigidly secured to the shaft. Desirably, the upper end of the spring is bent backwardly upon itself to form a U-shaped bend which engages with a pin secured in the collar 38. The springs are preloaded a predetermined amount in a manner to be described. Thus, as the shaft 29 is driven, a resilient driving torque is applied to the sprockets which in turn drive the chain. Other means than that described and illustrated may be used to obtain a resilient transmission of torque to the chain.

Each of the shafts 32 is journaled in three brackets 33 secured to longitudinally extending rails 39 which constitute a part of the main frame and extend throughout the entire length thereof. Desirably, the brackets 30 are also secured to the lower of these longitudinal rails 39.

Assuming a starting point of chain travel as being at the sprocket 35, the chain passes from the sprocket over the upper idler sprocket 7 rotatably mounted preferably upon roller bearings upon a vertical shaft 40 which is supported upon the main frame by means of brackets 41 (Figs. 2 and 23). From this point the chain passes transversely across the machine where it is received upon an idler sprocket 42 rotatably mounted on anti-friction bearings similarly to the sprocket 7 upon a shaft 43 which is secured to the main frame. There are a plurality of shafts 43 mounted upon the main frame in the same manner as the shaft 40. Each of the shafts 43 have mounted thereon three sprockets 42 each of which act as directional sprockets for the passage of the chain through the three levels 6, 10 and 12 of the drying chamber 4. From the sprocket 42 above mentioned the chain again traverses the width of the machine and passes over an upper idler sprocket 7 on a shaft 44. A plurality of shafts 44 are disposed along the right side of the machine which are all mounted in a similar manner in brackets 45. Following the chain from the last mentioned idler sprocket it again traverses the chamber 4 where it is received upon another sprocket 42 which in turn returns the chain to a driving sprocket 8 on the driving shaft 32. The chain continues to pass from side to side of the chamber 4 engaging successively the various idler and driving sprockets until it leaves the last idler sprocket 42 at the rear end of the upper lever 6 of the chain. It then passes over a directional pulley 46 which causes the chain to leave the sprocket tangentially thereto. As previously pointed out the chain passes forward and downward to the next lower level 10 where it follows a path similar to that above described and is led from the last idler sprocket 42 over another directional pulley 47 from where it passes to the lower level 12 of the chain.

At this level the chain is given a longer path through the chamber by passing from the last driving sprocket 8 successively over idler sprockets 48, 49 and 50, thence over the driving sprocket 51 and the idler 52 after which it returns to the upper level 6 along the angular path 13. Desirably the idler 52 is adjustable to take up slack in the chain. This may be accomplished in any desirable manner and as herein shown the sprocket is rotatably mounted in a bracket 53 which is adjustable horizontally along a slide 54 fixed on the main frame (Fig. 4). The bracket 53 which is secured in adjusted position upon the slide by means of bolts 55 the heads of which are received in the T-slots 56 in the slide 54. The bracket 53 is angularly adjustable with respect to the slide 54. This adjustment is obtained by providing slots in the bracket within which are received the bolts 55. The bracket 53 is also provided with a cylindrical boss 55a projecting into a horizontal slot 56a in the slide 56 acting to guide the bracket during adjustment. The angle of the bracket 53 should be such that the chain leaves the sprocket tangentially to the angular run of chain 13. The idler 52 is spaced outwardly from the main frame 1 in such position that the run of chain 13 and the articles carried thereby will be spaced from the other runs of the chain 9 and 11 sufficiently to prevent interference therewith.

In addition to the idler sprocket already described an idled sprocket 57 is situated in proper position to receive and guide the run of chain 58 as it leaves the chamber 4 and passes across the front end of the machine. Just before the chain reaches the idler 57 it passes over a directional pulley 59 (Figs. 23 and 24) which causes the chain to approach the idler 57 in a horizontal position. Another idler sprocket 60 receives and guides the run of chain 61 as it passes across the front of the machine. A third idler sprocket 62 receives and guides the chain in its third run 63 across the machine (Fig. 23).

The preloading of the springs 37 to establish the desired torque applied to the chain at the driving points may be accomplished in any convenient manner. A desirable method is as follows. When assembling the chain upon the sprockets all slack between the driving sprockets is taken up as the chain is wrapped around successive driving sprockets. When wrapping the chain around the sprocket there should be no tension in the springs 37. Desirably, the collars 38 are provided with set screws 64 (Fig. 2A). During the assembling of the chain upon the sprockets the said screws are loosened to permit the collars to rotate upon the shaft. To tension the springs 37 the collars are now rotated thus causing the sprockets to exert a driving torque upon the chain. When the springs are properly and equally tensioned the set screws 64 are tightened and if desired the collars may be permanently keyed or pinned upon their shafts. The proper tension to be applied to the springs is determined by the weight of the chain and its friction between driving points. This tension should be sufficient to overcome all but a slight component of the necessary force, and at least sufficient to move the length of chain between each resilient torque transmitting sprocket and the sprocket next proceeding. The sprockets 8 are all synchronized with the movement of the positive driven sprocket and ordinary movement of the chain. When the machine is started the tension in the spring is maintained by a rotation of the driving shafts 32. If the slight elongation of the chain takes place the resilience in the spring automatically compensates for such changes and prevents the accumulation of undesirable stress or slackness in the various sections of the chain. The over-all slackness in the chain is taken up by adjustment of the idler sprocket 52. Obviously by employing the principles of this driving system a chain of great length may be efficiently driven.

While the machine herewith described may be used to coat any article its use will herein be described in connection with shoe heels. As hereinbefore stated, chain 5 is provided with a plurality of spindles 14 preferably vertically disposed and spaced as closely together as the spraying operation will permit. The spindles are for the purpose of receiving the heels to be coated and have a body portion 66 (Fig. 8) which has an axial bore 67. The spindles are rotatively received upon a bushing 68 which is pressed into position upon an extension 69 of the pivot stud 70 of the chain 5. The upper end of the body portion of the spindle is provided with a sharpened point 71 (Figs. 8, 9 and 10) which preferably is hardened and such point 71 preferably is removable from the spindle and is held in position within the bore 72 by means of a set screw 73 which has threaded engagement with the internally threaded upper portion of the bore 67. The set screw 73 engages the enlarged lower end of the pin 71 thus firmly clamping the pin in position. The bottom end of the spindle 66 has formed thereon a pinion gear 75 by means of which the spindle is rotated during the spraying operation and such spindle rests upon a valve tripping member 76 which may be of any suitable construction and as herein shown is in the form of a collar slidable vertically upon the bushing 68. The tripping member is provided with a flange portion 77 the purpose of which will hereinafter appear and a chamber 78 is formed within the tripping member to receive a friction member 79 in the form of a spiral spring which frictionally engages the bushing 68 and seats upon the end walls of the chamber 78. Such tripping member is thus caused to have frictional engagement with the bushing and tends to hold the tripping member in any position to which it is moved along the bushing 68. Normally the tripping member 76 engages the top face of a disk 80 which is rotatably mounted on the extension 69 of the chain pivot pin 70 and the lower face of the disk 80 engages a link of the chain 5 and is held against upward movement by the lower edge of the bushing 68. The disk 80 acts to engage and actuate various control valves to be hereinafter described.

The loading station is preferably pneumatically operated and its operation automatically controlled by a suitable air valve actuated in timed relation to the speed of the chain. The chief purpose of the loading station is to impale the heels upon the pointed ends of the spindle 65 as they are fed thereto by an operator. The mechanism includes two principal elements one of which is an air cylinder 81 which actuates an impaling ram 82 while the other element is a feeding platform 83 upon which the heels are placed by the operator (Figs. 4, 5 and 6). Since the chain is continually in motion while the machine operates the ram, the ram and platform must be given motion in the same direction as the chain during the impaling operation. To accomplish this result the cylinder 81 is pivoted to swing about a vertical axis upon a shaft 84 (Fig. 5) journaled in a bracket 85 rigidly secured to a support rigid with the main frame of the machine. The lower end of the shaft has an extension 86 rigidly secured thereto which has a bore forming a pneumatic cylinder within which is received a piston 87 to which is connected a piston rod 88 provided with a pair of oppositely disposed keys 89a which are slidable axially within complementary grooves in the lower end of the extension 86. The purpose of the cylinder and piston will hereinafter appear. The lower end of the rod 88 is journaled in a block 89 secured in fixed relation to the bracket 85 and has rigidly secured thereto an arm 90 which projects into the path of the chain 5. The outer end of the arm 90 is suitably shaped to be engaged by the collars 76 on the spindle assemblies and is picked up during chain travel by the collars 76 on the chain substantially at the right hand dotted line position shown in Fig. 3 to move the ram and the loading platform with the chain during the article loading operation.

The movement of the arm 90 rotates the shaft 88 which in turn rotates the shaft 84 and thus moves the ram 82 and loading platform 83 in a substantially straight path above the chain 5. Since the distance between the axis of the shaft 88 and the center of the chain and the distance between the axis of the ram and the axis of the shaft 84 are the same the ram is moved at the same speed as the chain. When the ram has reached the end of its travel the arm 90 will have reached the left hand dotted position shown in Fig. 3 and will at this time disengage from the chain and return to its initial position under the action of a tension spring 91 connected at one end to the arm 90 and at its other end to the frame, the loading platform moving with the ram. To minimize the lateral stresses upon the shaft 88 and thereby permit its free rotational and axial movement another spring 92 desirably is attached to another arm 93 projecting outward from the shaft 88 in a direction opposite to that of the arm 90. The spring 92 acts in a direction opposite to that of the spring 91 and tends to rotate the shaft 88 in the same direction tending to return the ram 82 to its initial position. The outer end of the spring 92 may be secured to the frame of the machine in any suitable manner.

The upper end of the ram 82 has secured thereto a piston 94 which oscillates in a cylinder bore 95 within the ram supporting member, the piston and the ram being normally held in their extreme upper position by a compression spring 96 surrounding the ram and received in a chamber 97. Such spring 96 is seated at one end upon the bottom wall of the chamber 97 and at its other end against the lower face of the piston 94. Downward travel of the piston under the action of compressed air is resisted by the spring 96 but is actually limited by its engagement with the shoulder 98. The ram 82 preferably is axially bored and internally threaded throughout a portion of the bore to receive the threaded end of a heel contacting member 99, whereby the length of the ram is adjustable to accommodate different heights of heels by adjusting the member 99 within the bore of the ram 82. A lock nut 100 is provided for locking the member 99 in adjusted position. It is desirable that the ram be prevented from rotation and this end may be accomplished by forming a groove 101 longitudinally for a portion of the length of the ram within which is received the end of a screw 102 which acts as a key to prevent rotation of the ram and permit its free axial bodily movement.

Air for operating the piston and ram is fed to the cylinder 95 through a flexible conduit 103 which feeds air to the upper end of the cylinder through a suitable fitting, the conduit 103 being connected to a feed pipe line 104 which, in turn, is connected to a valve casing 105 having a valve 106 therein. Such valve is held on its seat by a spring 107, and is provided with a stem extension 108 projecting out of the casing into the path of a cam 109 upon the lower end of a vertically disposed shaft 110 journaled in a guide plate 111 securely fastened upon a cross member 112 which, in turn, is rigidly secured to the frame. The upper end of the shaft 110 has secured thereto a lever arm 113 upon the other end of which is pivotally received a valve actuator 114 which is pivotally connected at its other end to a lever arm 115 which, in turn, is mounted upon the upper end of a vertical shaft 116 journaled in the plate 111. During its valve actuating movement the member 114 moves with a motion parallel to the path of the chain 5. The member 114 projects through an opening 117 in the plate 111 and into the path of the chain 5 where it is engaged by the disks 80 upon the spindles 14 as they pass the loading station. Engagement of the disk 80 with the member 114 acts through the shaft 110 and the cam 109 to open the valve 106 thus actuating the ram 82. If it be desired to operate the conveyor chain without operating the ram, a valve 118 may be inserted in the air line 104. By cutting off the air supply with a valve 118 the ram is rendered inoperative.

It is important that the initial position of the arm 90 be positively determined each time it returns from its active stroke for the reason that it must be properly positioned to be engaged and picked up by the succeeding spindle upon the chain. Any suitable means may be provided to limit the backward movement of the ram. As shown in the drawings the upper end of the shaft 84 has secured thereto a gear 119 which rotates within a chamber formed in the upper end of a journaled block 85. A rack 120 is slidably received in the block 85 which meshes with the gear 119 (Figs. 4 and 5). A screw threaded stop plug 121 is received within a threaded aperture situated in alignment with the path of travel of the rack 120. By adjusting the position of the plug rack 120 may be made to engage the plug 121 when the ram has arrived at its correct initial position.

The plate 111 (Figs. 4, 5 and 8) constitutes one member of a spindle guiding mechanism which stabilizes the spindles laterally and protects the lower part thereof as they traverse the loading station. The plate 111 is provided at its upper end with an inwardly projecting flange 122 (Fig. 5) extending throughout the length of the plate 111. The other member of the guiding mechanism is a plate 123 similar in construction to the plate 111 and is oppositely disposed thereto to form a narrow chamber which embraces the chain and a portion of the spindles as they pass therethrough, the plate 123 being provided with an inwardly extending flange 124 similar to the flange 122. The inner face of the flanges 122 and 124 are spaced apart a distance slightly greater than the diameter of the body portion 66 of the spindles thus forming a guideway for the upper ends of the spindles firmly supporting them against lateral movement. The lower ends of the spindles are guided and supported by side rails 125 (Fig. 5) preferably extending throughout the length of the plates 111 and 123 and project between the inner faces of the connecting links 126 of the chain. The inner faces of the side rails 125 thus form a guideway for the rollers 127 of the chain and are spaced apart sufficiently to provide a slight amount of clearance to permit the chain to move freely between the plates. The chain and spindle are firmly supported from the bottom by a block 127x extending throughout the length of the plates 111 and 123. The block 127x is provided with a groove to receive the protruding ends of the chain pivot studs. The spindles of the chain are thus firmly guided and protected during the operation of impaling the heels upon the spindles.

As shown, the platform 83 for receiving the articles has a vertical flange 128 which is bolted to a plate 129 (Fig. 4) which, in turn, is rigidly secured to a platform supporting post 130. Desirably the platform is provided with adjustable heel positioning guides including a back positioning guide 131 and a side positioning guide 132. The platform 83 is angularly adjustable about an axis parallel to the path of the chain. This adjustment may be provided for in any suitable manner and as herein illustrated the plate 129 is provided with radially formed slots 133 within which are received bolts 134 which have threaded engagement with the flange 128. To adjust the platform a heel is placed thereon and the angle thereof is adjusted until the tread or top surface of the heel lies in a horizontal plane to be squarely engaged by the ram 82 as shown in Figs. 4 and 5. The heel positioning guides 131 and 132 are adjustable to enable the operator to properly position the heel upon the platform directly beneath the ram.

The supporting post 130 is vertically movable in a boss 135 integral with a carriage 136 (Fig. 4). The carriage has a dovetailed groove therein within which is received a dovetailed slide 137 which is secured to the block 85 in a position parallel to the path of the chain. The carriage 136 is connected to the ram cylinder 81 by means of a link 138 one end of which is pivotally received upon the lower end of the cylinder 81 the axis of the pivot point being in alignment with the axis of the ram. The other end of the link 138 is pivoted upon the carriage by means of a stud 139. The link 138 is curved in shape to avoid engagement with the post 130. Movement of the ram cylinder is thus transmitted to the carriage which in turn causes the platform to follow all movements of the cylinder 81, the motion of the platform being in a straight line parallel to the path of the chain. The upper end of the post 130 projects beyond the boss 135 and engages a cam lever 140 pivoted upon the upper end of the ram cylinder. The cam lever has a cam face 141 thereon which is engaged by the lower end of a screw 142 adjustable vertically in a bracket 143 of the machine. As the ram cylinder moves with the chain the screw 142 engages the cam face 141 forcing the cam lever downwardly which in turn pushes the post 130 and the platform downwardly against the action of the spring 144 surrounding the post 130 and received within an enlarged bore in the boss 135. The spring 144 seats at its lower end against the shoulder at the bottom of the enlarged bore and its upper end against a collar 145 fixed to the post 130 and slidable within the enlarged bore. Normally the spring 144 holds the platform in its uppermost position which position is determined by a stop collar 146 having screw threaded engagement with the post 130. The initial or upper position of the platform 83 is therefore determined by the adjustment of the collar 146 which is provided with a set screw 147 for locking the collar in its adjusted position.

It is desirable to cushion the end of the return movement of the ram cylinder and platform which may be done in any desired manner. One method of accomplishing this result is to provide a dash-pot 148 (Fig. 7) which is secured to the outer end of the slide 137. A plunger 149 is secured upon the end of the carriage 136 in axial alignment with the dash-pot and enters the dash-pot throughout a portion of the final return motion of the carriage 136.

An air connection 150 communicates from the upper end of the cylinder 95 to the bore in the extension or cylinder 86 below the piston 87. The piston 87 is floating with respect to the rod 88 having a loose T-slot connection therewith. The looseness of the connection prevents the possibility of cramping the piston within the cylinder if misalignment of the rod 88 and the piston should take place. The effective area of the piston 87 is determined by the difference in area of the piston and the upper end of the rod 88 and is much less than the area of the piston 94.

Means are provided for preventing the platform 83 from swinging out of position during the loading operation. This may be accomplished in any suitable manner such as by means of a spline connection between the post 130 and the boss 135. Desirably a spline 151 (Fig. 4) is fixed in the post 130 and has vertical axial movement within a slot formed in the boss 135.

The operation of the loading station is as follows: When a spindle enters the loading zone the operator places a heel in correct position upon the platform as determined by the guides 131 and 132. The air valve 106 is timed to open directly after a sufficient period has elapsed to enable the operator to place a heel on the platform. When the valve opens the ram operates to impale the heel upon the pin 71. The length of the ram is so adjusted as to force the heel downwardly until the pin 71 penetrates the heel a predetermined amount sufficient in depth to retain the heel firmly in place thereon. At the end of this impaling stroke the piston 94 seats upon the shoulder 98. The action of the ram as the pin penetrates the heel moves the platform 83 downwardly and when the ram has completed its movement the cam lever 140 engages the screw 142 and forces the platform down away from contact with the heel thus permitting the spindle and the impaled heel to move freely away from the loading station. As previously pointed out during the impaling operation the platform and the ram travel at the same speed as the spindle. At the end of the impaling operation the arm 90 disengages from the chain thus permitting the ram cylinder and platform to return to its starting position under the action of the springs 91 and 92. When the succeeding spindle arrives at the loading zone the operations above described are repeated. At the end of this sequence of operations the valve 106 closes and pressure within the cylinder is exhausted through the port 106a. The central section of the stem of the valve is reduced in diameter to permit flow of air while the outer end of the valve stem fits the valve stem chamber closely and prevents escape of air in that direction. In Fig. 4 the valve is shown open at which time the exhaust port 106a is covered by the large outer portion of the valve stem. When the valve is closed by the spring 107 the exhaust port is opened and the accumulated air in the cylinder escapes to the atmosphere. To provide clearance for the spindles as they traverse the loading station a slot is formed in the platform 83 and is continued upward into the plates 128 and 129.

During the operation of the machine if the operator fails to place a heel in position upon the platform the ram will operate and when it reaches the bottom of its stroke the pressure in the cylinder 95 will increase until it reaches the pressure in the air line 104. This pressure is conducted through the air connection 150 to the piston 87. The air pressure at this time is sufficient to raise the shaft 88 and the arm 90. The arm 90 in its upward movement engages the flange 77 on the collar 76 which raises the collar and the spindle a predetermined amount and due to the frictional engagement of the collar upon the bushing 68 the collar and spindle remain in their raised position, as shown in Fig. 6. The upward movement of the arm 90 is limited by engagement of a stop collar, adjustably received on the lower end of the shaft 88, with the block 89. When the cylinders have been exhausted a compression spring 152 surrounding the shaft 88 acts to return the arm to its normal position.

The collar or tripping member 76 is raised a distance sufficient to avoid engagement of the valve actuator associated with the valve which admits air to the spray gun. When the raised tripping member passes the spray station the spray gun fails to operate, and no spray material is wasted. In a subsequent operation the tripping member 76 and the spindle are forced down into normal position before they again reach the loading station in a manner to be described. It will be noted that the piston 87 is raised subsequently to the downward stroke of the piston 94. When the air is first admitted to the cylinder 95 it expands and its pressure drops momentarily while the piston 87 is unaffected due to its relatively small effective area and the weight and friction of the parts connected thereto. However, at the end of the stroke of the piston 94, the pressure builds up and when maximum pressure is reached, the piston 87 is actuated, but obviously if a heel is present, the tripping member and spindle are prevented from moving upward. Other means than that shown may be employed to raise the arm 90 and lift the tripping members 76, when no heel is presented at the loading station.

Another mechanism for effecting the lifting of the tripping members is shown in Fig. 9. This mechanism operates mechanically and comprises a lever 153 fulcrumed adjacent to its center upon a block 154 rigidly secured to the ram cylinder. One end of the lever preferably is bifurcated and embraces the ram 82. The other end of the lever has gear teeth formed thereon disposed in the form of a segment 155, having its axis at the fulcrum of the lever. The segment 155 meshes with a circular rack 156 formed on the shaft 157. The shaft 157 is similar in construction and function to the shaft 88 and is splined to the pivot shaft 84 upon which the ram cylinder swings. The shaft 157 has an arm 158 secured to the lower end thereof. The arm 158 is identical in structure with the arm 90 and functions in the same manner.

The operation of this form of the mechanism is as follows. The lever 153 is adapted to be engaged by the locknut 100 upon the ram 82. The lever 153 is positioned to permit the ram to descend a distance sufficient to impale the heels upon the spindles before it engages the lever. When a heel is present, therefore, no movement is imparted to the lever. At this time, however, the ram has not reached the limit of its travel downward and should there be no heel present, it continues downward, and in doing so, engages and moves the lever 153 about its fulcrum, which raises the shaft 157 and the arm 158, which in turn, raises the tripping member 76 and its associated spindle. When the spindle with no heel thereon passes the spray station, the spray gun fails to operate, thereby preventing waste of spray material. A spring 159 acts to depress the arm 158 immediately after the ram is again raised by its spring. The spring 159 surrounds the shaft 157 and engages the arm 158 at one end and at its other end a boss 160 on the block 89 through which the shaft 157 passes.

The heels pass from the loading station through a brushing station 161 (Fig. 20). This station is provided with two or more fixed brushes arranged with the ends of their bristles opposing and spaced apart the required distance to thoroughly brush the heels as they pass therebetween. Any matter brushed from the heels is conducted away through an opening 162 which communicates with the conduit 18 and is thus carried away by the fan 17. Desirably the brushes are mounted on supports 163 which project through the casing 164 and are secured in adjusted position in any suitable manner such as by means of set screws.

From the brushing station the heels are conveyed to the spray station wherein the chain and spindles are firmly guided as they pass therethrough in a manner similar to that employed at the loading station. A pair of plates 164 and 165 (Fig. 11) are situated on opposite sides of the chain and secured to a base plate 166 rigidly fastened to the support 112. The plates have inwardly extending flanges 166 acting to guide the upper end of the spindles while the chain and the lower end of the spindles is guided laterally by the side rails 167 while the bottom of the chain is supported by a guide block 168.

To properly spray coat the heels they must be rotated during the spraying operation. It has been determined that two complete revolutions or more are required to obtain the best results. This rotation must be sufficiently fast to take place within the length of time it takes the spindles to travel through the zone of spray from the spray gun. To obtain the required rotation a mechanism is provided the necessary power for which is obtained from the chain itself. A sprocket 169 is mounted upon a vertical stud shaft 170 secured rigidly upon the base plate 166 (Figs. 11 and 12). Rigid with the sprocket and rotating upon the shaft therewith is a gear 171 which meshes with a gear 172 which is keyed to a shaft 173. The shaft 173 is journaled in the outer end of an arm 174 which is pivotally mounted to swing upon the stud shaft 170, and the shaft 173 projects upward through and beyond the arm 174 and is keyed to a gear 175 the periphery of which projects into an opening 176 in the plate 164 (Fig. 11). The arm 174 has a boss or shoulder 177 projecting outwardly from the outer end thereof into the path of a plunger 178 which is slidably received in a horizontal bore 179 in a post 180 rigidly secured to the base plate 166. The plunger is provided with a stem 181 which is received in an aperture 182 at the bottom of the bore 179. The plunger is backed by a spring 183 which surrounds the stem and seats at one end against the bottom of the bore and at its other end against the bottom of the plunger. The plunger therefore urges the arm 174 and gear 175 resiliently inward toward the chain. The plane of the gear 175 conincides with the plane of the gear 75 on the spindle and meshes therewith as the spindles pass through the spraying zone. The inward movement of the gear 175 toward the spindle 75 is limited by engagement of the shoulder 177 with a stop 184. The stop is so positioned that when shoulder 177 is in contact therewith the gear 175 is in position to mesh with the gears 75 on the spindles at the entering end of the spraying zone. The gears remain in mesh throughout the traverse of the spindle through the spraying zone.

The spray gun 185 is controlled by an air valve 186 within a valve casing 187 (Figs. 11 and 12). The valve is similar in construction to the valve described in connection with the loading station but has no exhaust port and is held closed by a spring. The stem 188 of the valve 186 projects into the path of a cam 189 fixed upon the lower end of the vertical shaft 190 journaled in a boss on the plate 164. The upper end of the shaft 190 has fixed thereon an arm 191 upon which is pivoted one end of a valve actuator 192 the other end of which is pivoted upon the outer end of an arm 193 having the same length as the arm 191 and disposed in parallel relation thereto. The arm 193 is secured upon the end of a vertical shaft 194 journaled in the plate 164, which shaft 194 functions as a support and pivot for the arm 193. When the valve 186 is closed the left hand end of the valve actuator 192 projects into the path of the tripping member 76 and when engaged thereby the valve actuator opens the valve 186 and retains it in open position until the shoulder 195 is reached at which time the actuator disengages from the tripping member and the valve closes as is best shown in Figs. 11 and 12. The length of the valve actuator from its left hand end to the shoulder 195 determines the length of time the spray gun acts. The active period of the spray gun therefore is predetermined by properly designing the valve actuator.

The air supply for actuating the spray gun is received through the pipe line 196 which enters the valve casing 187. When the valve opens, air is admitted to the line 197 which preferably is flexible and connected at one end to the outlet of the valve and at its other end to the spray gun. The spray material enters the spray gun through the conduit 198 which is connected to a suitable reservoir 199 (Fig. 1) containing the spray material. The flexibility of the conduits 197 and 198 permits the gun to be adjusted into correct spraying position. To facilitate such adjustment a support 200 is provided, the lower end of which is adjustably received in a block 201 rigidly secured to the base plate 166. The upper end of the support 200 is provided with a flexible connection 202 which clamps the upper end of the support and is adjustable along the length thereof. The connection 202 is also provided with a clamping means for receiving the spray gun. The connection 202 is universally adjustable to enable the spray gun to be moved into its proper spraying position.

The spindle rotating mechanism is enclosed in a casing 203 (Fig. 1) to protect it from spray material coming from the spray gun. The upper section of the spindles is the only portion of the moving elements which is exposed to the spray. The casing 203 therefore prevents the accumulation of spray material on the working parts of the mechanism. The spray station desirably is also provided with a hood 204 to prevent surplus spray material from escaping into the atmosphere. The hood communicates with the exhausting conduit 18 through which a draft of air is drawn by the fan 17.

The operation of the spray station is as follows. As the spindles bearing the heels reach a predetermined point, the pinion gear 76 thereon engages and meshes with the gear 175 and remains in mesh therewith while the spindles pass through the spraying zone after which they disengage from the gear 175. As the pinion gear traverses the curvature of the gear 175 the gear yields outwardly forcing the shoulder 177 on the arm 174 against the spring pressed plunger 178. Simultaneously with the meshing of the gears 75 and 175 the valve actuator is engaged by a tripping member 76 on the spindle bearing the heel to be sprayed. The heel then receives its coat of spray material while it is rotated by the gear 175. At the same time that the gear 75 disengages from the gear 175 the valve 186 closes and the spray coated heel passes along and enters the drying chamber. It is desirable to rotate the heel two or more complete revolutions while it is passing through the spraying zone. The rotating mechanism herein described imparts the necessary rotation to the spindles. The peripheral speed of the gear 175 is substantially the same as the speed of the chain but is traveling in the opposite direction at the point where engagement with the spindles takes place. The relative speed between the periphery of the gear and that of the chain is therefore substantially twice that of the speed of the chain. The resulting speed of the spindle therefore is doubled over that which it would have if the pinion 75 engaged with a stationary rack. As shown herein the pitch diameter of the gears 171 and 172 are the same. To vary the degree of rotation obtained from the mechanism the ratio of the pitches of these gears may be chosen to produce the desired degree of rotation.

In place of the teeth of the intermeshing gears 75 and 175 other means may be employed to transmit the desired rotation to the spindles. For instance, a friction drive may be established such as that shown in Figs. 13 and 15. In this construction the spindle is provided with a V groove 205 whose driving faces 206 may be disposed at the proper angle to produce maximum efficiency. In place of the gear 175 a friction wheel 207 is provided. The friction wheel 207 is provided with a driving face properly shaped to enter the V groove 205 and engage the driving faces 206 thereof. Desirably the friction faces 208 upon the wheel 207 are convex in form and engage the sides of the V groove along a minimum area. The period of time during which the wheel 207 is in engagement with the spindles is adjustable in the same manner as the intermeshing gears 75 and 175. While the V grooved wheel on the spindle is traversing the curved periphery of the wheel 207 the wheel and the arm 174 yield outwardly against the plunger 178. Any suitable material may be employed for the friction faces 208.

Still another form of drive may be employed for rotating the spindles as shown in Fig. 16 wherein one of the interengaging members 207 and 75 may be resilient and the other non-resilient and having projections such as teeth formed on its periphery. As shown the wheel 207 is provided with a resilient face 207a while the spindle 65 is provided with a non-resilient engaging member such as a gear 75. In this form of drive the teeth sink into and deform the resilient face 207a as shown, thereby establishing a drive which may be considered practically positive in its action.

As above set forth, there are three spray stations on the machine. Each of these stations is identical in structure. The above description of one, therefore, will be sufficient. The stations may be supplied with spray material in any desired manner. As shown in the drawings, the guns 185, 209 and 210 are respectively supplied with spray material by the containers 199, 211 and 212, each gun being connected with its respective container by a suitable line of tubing. The air is supplied to the machine through a pipe line 213 connected to a compressor and accumulator which are not shown in the drawings. Desirably, the air is first conducted through one or more separators 214 within which excessive moisture and foreign matter in the air is removed. From the separators the air passes to a manifold 215. Air connections 195, 216 and 217 communicate with their respective spray guns and are desirably provided with automatic reducing valves 218 which are manually adjustable to obtain the desired pressure upon the spray guns. To force the spray material to the guns, air pressure is admitted from the main air supply to the containers in the usual manner and desirably the pressure on the spray material is automatically maintained constant by suitable reducing valves 219.

After each coat of spray material has been applied to the heels they pass through the drying chamber in the manner hereinbefore set forth and arrive at the discharging station. The discharging station is provided with a ram composed of two or more ejectors 220 (Figs. 17, 18 and 19) which engage the heel from below and strip them from the pins 71 on the spindles and cause them to fall into a receptacle 221 (Fig. 1). The ram or ejector is, as shown, pneumatically operated and may conveniently be operated from the valve 106 which controls the loading station. A separate valve may, however, be employed to operate the discharging means. The air line 104 is provided with a branch line 222 which conducts air into the cylinder 223 formed in a cylinder block 224 bolted to a supporting plate 225 rigidly fixed upon the main frame of the machine (Fig. 17). The piston 226 projects beyond the cylinders and has a reduced end portion upon which is received a yoke member 227 to which is secured a slide 228 axially movable within a bore 229 within the block 224 parallel to the axis of the cylinder 223. The slide 228 has a reduced end portion extending through the yoke 227. The piston and slide are held in rigid parallel relation by means of the nuts 230 having screw threaded engagement with the reduced portions of the piston and slide.

The slide 228 has a reduced portion 231 at its end opposite to its connection to the yoke 227 and this portion 231 passes through the end of the block 224 and is provided with a spring 232 seated at one end upon the bottom of a counterbore 233 in the end of the block. The other end of the spring bears against a sleeve nut 234 which has threaded engagement with the outer end of the portion 231. The position of the sleeve upon the extension 231 is fixed by a lock nut 235. The spring 232 acts to maintain the piston and slide in their extreme right hand position. When air is admitted to the cylinder the piston and slide are forced toward the left with considerable force. It is desirable therefore to cushion the end of the working stroke of the piston. One method of obtaining this result is to secure a relatively heavy spring 236 upon the sleeve portion of the nut 234. The spring 236 is shorter than the spring 232 and engages the block 224 after the piston has traveled about one-half of its stroke. During the balance of the working stroke both springs 236 and 232 are acting to retard the motion of the parts. The springs thus act to prevent the slide 228 from terminating its stroke with a hammer blow which would cause rapid wear and deterioration of the mechanism.

The slide 228 has formed therein a longitudinally disposed slot 237 within which is pivotally received one end of a link 238 the other end of which is pivoted to a plunger 239, which plunger 239 reciprocates within a frame 240 rigidly secured to the plate 225. Cooperating with and driven by the plunger 239 are a pair of ejectors 220 which engage the heel or other object and strip it from the pin 71 in the end of the spindle. Preferably the ejectors and plunger 239 are disposed at an angle from the vertical, thereby to permit the ejectors to engage the heel adjacent a line drawn longitudinally of the chain and through the axis of the spindle. The angular disposition of the ejectors also causes the heels to fall outward away from the machine when they are ejected.

The connection between the plunger 239 and the ejectors is in the form of an equalizer 242, one end of which is cylindrical and is rotatably received within a bore 243 in the plunger. The other end of the equalizer is in the form of a bar 244 disposed at right angles to the other end thereof to form a T-shaped member. The projecting ends of the bar 244 are received in notches 245 in the lower ends of the ejectors 220 desirably, but not necessarily, the ejectors are cylindrical and the notches 245 are milled substantially through one-half of their diameter, the top and bottom walls of the notches being divergent inwardly. The ends of the bar 244 are rounded and received within the tapered notches as shown in Fig. 18. The two ejectors, therefore, may move relatively to one another, and, in so doing, the equalizer rocks about the axis of its cylindrical portion. To facilitate the construction and assembly of the ejecting means, the ejectors 220 desirably are received in parallel bores 246 in a removable block 247 secured in position adjacent and parallel to the plunger 239 by means of screws 248.

At the discharging station the chain is received between a pair of plates 249 fixed to the plate 225. The upper ends of the plates have secured rigidly to their inner face a pair of guide bars which embrace the body 68 of the spindle and present shoulders 250 adapted to engage the shoulder 251 upon the spindles above the pinion gear 75 thereon. The engagement of the shoulders 250 with the shoulder 251 prevents the spindles from lifting upon their bushings 68 when the heels are stripped from the pins 71. The guide bars project beyond the plates in the direction from which the chain approaches the discharging station and this end of the bars are disposed at an angle to the chain with their extreme left hand end as shown in Fig. 19 in such position that the shoulder 250 is slightly higher than the shoulder 251 of the spindles when they are in their raised position. The shoulder 250 therefore acts to cam the spindles downward upon their respective bushings into normal position as the chain carries the spindles into the discharging zone. When the spindles have reached the portion 252 of the guide bars the shoulders 250 are parallel to and spaced from the chain to cause the spindles to assume their normal position. While the chain passes through the discharging station its weight is supported by a guide block 253.

The operation of the discharging station is as follows. As above pointed out the ejectors are positioned at a point along the chain in advance of the loading station and at such distance therefrom that when the valve of the loading station is open, a point 71 of the spindle which is at this time passing the discharging station will be centrally positioned therebetween. The air admitted at this time through the pipe 222 actuates the piston 226 which in turn actuates the ejectors through the medium of the plunger 229 and the slide 228. It will be noted that while the motion of the piston 226 is substantially uniform the motion of the plunger 239 and the ejectors 220 are modified by the link 238. During the first part of the stroke of the piston the motion of the ejectors is relatively rapid and substantially the same as that of the piston. At about medium position as shown in full lines in Fig. 17 the speed of the piston and ejectors remains approximately the same. As the ejectors approach the end of their stroke, where they engage with the heel, their motion is decelerated until the link reaches the position shown by the dotted lines in Fig. 17 at which time the ejectors will have completed their working stroke. At this time no motion is transmitted to the ejectors and the heels will have been removed from the pins 71. The deceleration of the final thrust of the ejectors causes the heels to be removed without being thrown with force away from the machine.

If the bottom face of a heel or any other object being sprayed be irregular, the equalizing member of the ejecting means insures a symmetrical application of force upon the object. Should one of the ejectors engage the object in advance of the other this ejector would yield until the other ejector engaged the object and then the ejecting force would be applied equally at both points of contact. In this manner the ejected object will fall within a limited area where they are readily received in a container. Such a means of removing the completed articles not only facilitates their handling but also prevents injury thereto by forcible contact with other objects in the container. Exhausting of the air at the loading station also exhausts the cylinder 223 thus permitting the spring 232 to return the ejectors to their initial position.

As a safety feature to prevent the finished heels or other articles from injuring the loading station in case the discharging station failed to operate, an additional stripping or ejecting means is provided. This ejecting means is situated between the above described discharging station and the loading station. Any suitable means may be employed to accomplish this end. As herein shown in Fig. 21, a pair of plates 254 embrace the chain and are secured to the cross member 112 of the main frame. A pair of stripping plates 255 are firmly secured to the inner faces of the upper portion of the plates 254. The plates 255 are separated sufficiently to allow the body portion of the spindles to pass freely therebetween while their lower edges 256 are positioned to engage the shoulder 251 on the spindles during the stripping of the heels. The upper edges 257 of the plates 255 are disposed at an angle longitudinally and are beveled laterally to present a narrow edge for engagement with the heels. If the heel should remain on a spindle after passing the main discharging station the heel will engage the plates 255 and will be stripped from their spindles as they are carried through the second discharging station by reason of the angular disposition of the upper edges of the plates 255. Desirably, the contacting edge of the front plate 255 is lower than the back plate which causes the heel as it passes along the plates to be tipped forward and when stripped from the pin will fall in front of the machine instead of in the other direction where it may be deposited in the mechanism and cause injury thereto.

It may be found desirable to rotate the heels while they pass between brushes at the brushing station 161 thereby to more thoroughly remove dust and foreign matter from the heels before they are sprayed. A desirable method of accomplishing this result is illustrated in Figs. 20 and 22 wherein a resilient abutment 258 frictionally engages the pinion gears 75 upon the spindles. The abutment is faced with a resilient material such as a strip of rubber or leather 259 which desirably is secured in a dovetailed slot 260 in the abutment 258. The abutment is pivoted to swing in a horizontal plane upon a rigid post 261. The abutment is held in resilient engagement with the pinions as the spindles pass between the brushes by means of a spring pressed plunger 262 slidably received in a bracket 263. To prevent lateral displacement of the chain due to the pressure exerted by the abutment 258 a rigid supporting bar 264 is provided which engages the rollers of the chain on the opposite side to that upon which the abutment 258 engages the chain. By thus rotating the heel all foreign matter is removed from every part of its surface.

In Fig. 25 is shown diagrammatically the manner in which a three phase electric supply circuit 265 is connected to the driving motor 23 and the other electric units associated with the machine. Desirably, the motor 23 is controlled by a push button switch 266 which acts through a standard relay switch 267 to start and stop the driving motor. As is usual in relay switches of this type a pilot circuit 267 is opened and closed by a stop button 268. When the motor is operating the circuit 267 is closed. Included in this circuit is a magnet winding 269 which retains the main circuit contacts in their closed position. If the circuit 267 is opened the main motor circuit is de-energized and the motor stops. A safety stop device is incorporated in the machine to stop the motor when the air pressure in the air supply system drops below the required degree for proper operation of the air actuated elements. This safety device desirably is in the form of a standard air pressure operated switch 270 which communicates with the main air line 213. When the air pressure in the line is normal the switch 270 remains closed thereby providing normal operation of the manual control means. If the air pressure in the supply system drops below a predetermined degree the switch 270 opens thus stopping the motor which cannot be started again until the air pressure has been restored to normal. In this way spindles carrying heels thereon cannot be carried into the loading station which might cause injury to the heels or to the machine.

A convenient and waste preventing device is applied to the machine which automatically cuts off the air supply when the motor stops. Should the motor be stopped either intentionally or otherwise and the conveyor chain come to rest with the valve actuating the spray gun open the air supply is cut off thereby preventing waste of spray material. To accomplish this result an electrically operated valve 272 is inserted in the air supply 213 in position to control the flow of air to the machine. The valve 272 is of the type which normally remains open while the machine is in operation. A solenoid acts to maintain the valve open and receives its energy from parallel connection with the motor circuit 271. When the motor current is cut off the valve automatically closes thus cutting off the supply of air to the machine. When the current is again restored to the motor circuit, the valve 272 automatically opens and the machine again functions normally. The motor 273 which drives the fan 17 is connected to the motor circuit 271.

The heaters 16 are energized from the motor circuit 271 and are therefore receiving current only when the machine is in operation. Each of the three heaters may be provided with individual switches 274. By means of the switches the degree of heat in the chamber 4 may be manually controlled. If desired, automatic means may be provided for maintaining a predetermined temperature in the drying chamber. Such means may consist of a thermostatic switch 275 inserted in the pilot circuit 276 of a main heat control switch 277. The thermostatic switch is provided with an actuating bulb 278 situated within the chamber. The pilot circuit 276 has therein a switch 279 for manually cutting off all of the heaters. As shown in the drawings the heaters 16 are connected to one phase of the motor circuit. The heater units may however be designed for connection to the three phases of the motor circuit. The motor 280 for driving the fan unit 15 is connected in the heater circuit and operates when the heat is on.

It will be understood that the invention is not hereby restricted to the particular arrangement of the spray guns shown and described herein. Obviously the position and the number of the spray guns employed depends entirely upon the nature of the object which is being coated. For instance, it may be found desirable in the spraying of heels to apply at least one coat of spray material to the periphery of the heel seat. This may be done by employing an additional spray gun 281 at one of the spray stations as shown in dotted lines in Fig. 1. This gun is positioned to spray the seat of the heels as they pass the spray station. This additional spray gun is connected with the air supply and the supply of spray material for simultaneous operation with the spray gun 210.

The particular construction and arrangement of the elements of the machine illustrated in the drawings and above described are not intended to restrict the scope of the invention, and it will be understood that the construction and arrangement of parts may assume any form within the spirit and scope of the following claims. Pursuant to this end a modified construction of the main cylinder 81 at the loading station is shown in Fig. 6A. In this form of the invention the air supply from the connection 103 is led into the upper end of the cylinder 95 in the same manner as that shown in Fig. 5 while the air connection leading from the cylinder 95 to the bore of the extension 86 and which acts to move the piston 87 upwardly is connected to a port 150A which desirably is of small dimension longitudinally of the cylinder while its horizontal dimension may desirably be substantially greater. This port is so situated with respect to a piston 94 that when the piston is at the bottom of its stroke the port 150A is uncovered thereby admitting air to the connection 150 and actuating the piston 87. In this construction air is admitted to the cylinder 95 by the valve 106 which moves the piston 94 and the ram 82 downwardly to impale a heel upon a spindle similarly to the function of the construction shown in Fig. 5. If there is no heel present upon the spindle at the loading station the piston 94 will be depressed to the end of its stroke and air will pass through the port 150A and reach the piston 87 through the air connection 150 which will raise the piston and the arm 91 thereby moving the tripping member 76 out of the path of the valve actuator at the spray station thereby preventing the waste of spray material.

Having thus described my invention, I claim:
1. A machine for spray coating small articles comprising a drying chamber, an endless conveyor chain passing in a tortuous path through said chamber, a plurality of pointed spindles on said chain, a pneumatically operated loading ram acting in timed relation to the chain to drive the articles upon said spindle, means for moving the ram in the same direction and at the same speed as the chain while the ram operates, means for subsequently spraying the articles and means for discharging from the chain the sprayed and dried articles.

2. A machine for spray coating small articles comprising a drying chamber, an endless conveyor chain passing in a tortuous path through said chamber, a plurality of pointed spindles on said chain, a pneumatically operated loading ram acting in timed relation to said chain to drive the articles upon said spindles, means actuated by engagement with said spindles for moving the ram in the same direction and at the same speed as said chain while the ram operates, means for subsequently spraying the articles and means for discharging from the chain the sprayed and dried articles.

3. A machine for treating articles comprising a conveyor chain, a loading station, a plurality of spindles for receiving the articles, a treating station having means for spray coating the articles, tripping means on each of said spindles acting to control said spray coating means and having an active and an inactive position with respect to the spindles, automatic means for selectively positioning said tripping means in active or inactive position respectively when an article is present upon a spindle or when a spindle has no article thereon whereby said spray coating means is rendered inactive when no article is present upon the spindle at the spray station.

4. In a machine for treating articles an endless conveyor chain for carrying the articles to be treated, a pneumatically operated automatic loading ram, a plurality of pointed spindles on said chain upon which the articles are forced by said ram, an article treating station having spray coating means, tripping means on each spindle for controlling said spray coating means and having an active and an inactive position with respect to the spindles, pneumatically operated means receiving an air supply from the cylinder of said pneumatically operated ram and acting automatically to selectively position each of said tripping members in inactive position when no article is present upon a spindle at said treating station whereby said spray coating means is rendered inactive when no article is present upon the spindle.

5. In a machine for spray coating small articles an endless conveyor chain, a plurality of pointed spindles on said chain, a spray gun, a valve for controlling said spray gun and having an actuator situated adjacent to the path of said chain, a tripping member on each of said spindles normally held in position to engage and actuate said valve when a spindle passes the gun, means for impaling the articles upon the spindles, means acting automatically to shift said tripping members out of the path of said valve actuator when no article is present on a spindle whereby the spray gun is rendered inoperative when an empty spindle is presented at the spraying station.

6. In a machine for spray coating small articles an endless conveyor chain, a plurality of pointed spindles on the chain, a spray gun, a valve for controlling said spray gun and having an actuator situated adjacent the path of the chain, a tripping member on each of said spindles normally held in position to engage and actuate said valve when a spindle bearing an article passes the gun, an automatic pneumatically actuated ram for impaling the articles on the spindles, pneumatically operated automatic means for shifting said tripping members out of the path of said valve actuator when an empty spindle passes the spray gun.

7. In a machine for spray coating small articles an endless conveyor chain, a plurality of pointed spindles on the chain, a spray gun, a valve for controlling said spray gun having an actuator adjacent the path of said chain, a tripping member on each of said spindles normally held in position to engage and actuate said valve when a spindle passes said gun, an automatically actuated ram for impaling the articles on the spindles, mechanical means actuated by the over travel of said ram when no article is present to be driven on the spindle, acting to shift said tripping means out of the path of said valve actuator whereby said spray gun is rendered inoperative when an empty spindle passes.

8. In a machine for spray coating small articles an endless conveyor chain for carrying the articles while they are treated, a plurality of pointed spindles on said chain, a spray gun, means for controlling said gun having an actuator adjacent the path of said chain, a tripping member on each of said spindles normally held in position to engage and actuate said spray gun actuator when a spindle passes the gun, a pneumatic cylinder having a piston and a ram connected thereto operable to impale the article on said spindles, another pneumatic cylinder having a piston therein and a lifting member connected to the piston, an air connection between the two cylinders, automatic controlling means acting to admit air to said first mentioned cylinder whereby said first mentioned piston and ram are caused to drive an article upon a spindle and when said first mentioned piston is actuated with no article present to be driven on a spindle the air pressure accumulated in said cylinder is conducted through said air connection and actuates said lifting means which engages the tripping member upon the spindle moving it out of the path of said spray gun actuator whereby said spray gun is rendered inactive when an empty spindle passes.

9. In a machine for spray coating small articles having the elements defined in claim 7 and in which the area of the second named piston is substantially less than the other piston.

10. In a machine for spray coating articles having the elements defined in claim 8 together with means for resiliently supporting said driving wheel to permit bodily motion thereof laterally with respect to the chain.

11. In a machine for spray coating small articles an endless conveyor chain for carrying the articles, a plurality of driving elements engaging the chain at spaced intervals one of said elements having positive rigid driving connection with a source of power, the remaining driving elements resiliently exerting a predetermined driving torque upon said chain, a plurality of pointed spindles on said chain, a loading ram acting automatically to impale the articles upon said spindles, an arm engaged by said spindles acting to move said ram at the same speed and direction as said chain during the impaling operation, a spray gun, automatic means for actuating the gun when an article is present on a spindle and to render the gun inactive when no articles are present on the spindle at the spray station, and a discharging ram having a decelerated working stroke acting to eject the articles from the spindle and consistently deposit them within a limited area.

12. In a machine for spray coating small articles an endless conveyor chain, a plurality of pointed spindles on said chain for receiving the articles to be sprayed, a pneumatically operated loading ram acting to impale the articles upon said spindles, means for moving the ram in the same direction and at the same speed as the chain while the ram is actuated, a loading platform to receive the heels before they are impaled upon the spindles, means receiving its motion from said ram for moving said loading platform linearly at the same speed and in the same direction as said chain during the impaling operation, means for spraying the articles, and means for discharging the sprayed articles from said spindle.

13. A machine of the character described, comprising an article conveyor, a plurality of spaced article impaling means on said conveyor, a spray station, an article support on which an article rests prior to being impaled on the impaling means carried by said conveyor, a ram for impaling the article on the said impaling means carried by said conveyor, and means controlled by movement of said conveyor for discharging articles therefrom.

14. A machine of the character described, comprising an article conveyor, a plurality of spaced article impaling means on said conveyor, a spray station, an article support on which an article rests prior to being impaled on the impaling means carried by said conveyor, a drying chamber through which the article passes, and means controlled by movement of said conveyor for discharging articles from the conveyor.

15. A machine of the character described, comprising an article conveyor, a plurality of spaced article impaling means on said conveyor, a spray station controlled by movement of said conveyor for coating articles carried thereby, an article support on which an article rests prior to being impaled on the impaling means carried by said conveyor, and a ram for impaling the article on the said impaling means carried by said conveyor.

16. A machine of the character described, comprising an article conveyor, a plurality of spaced article impaling means on said conveyor, a spray station, an article support on which an article rests prior to being impaled on the impaling means carried by said conveyor and a ram for impaling the articles on the said impaling means carried by said conveyor, said article support being normally out of the path of movement of said conveyor and movable into said path by conveyor movements.

17. A machine of the character described, comprising an article conveyor, a plurality of spaced article impaling means on said conveyor, a spray station, an article support on which an article rests prior to being impaled on the impaling means carried by said conveyor, a ram for impaling the articles on the said impaling means carried by said conveyor, said article support being normally out of the path of movement of said conveyor and movable into said path by conveyor movement, and means for moving said article support out of supporting relation with the article after said article is impaled on said impaling means.

18. A machine of the character described, comprising an article conveyor, a plurality of spaced article impaling means on said conveyor, a spray station, an article support on which an article rests prior to being impaled on the impaling means carried by said conveyor, a ram for impaling the articles on the said impaling means carried by said conveyor, means for moving said article support out of supporting relation with the article after said article is impaled on said impaling means and means for moving said article support out of the path of travel of said conveyor.

19. A machine of the character described, comprising an article conveyor, a plurality of spaced article impaling means on said conveyor, a spray station, an article support on which an article rests prior to being impaled on the impaling means carried by said conveyor, and a ram for impaling the articles on the said impaling means carried by said conveyor, said ram being normally out of the path of movement of said conveyor and movable into said path by the conveyor movement.

20. A machine of the character described, comprising an article conveyor, a plurality of spaced article impaling means on said conveyor, a spray station, an article support on which an article rests prior to being impaled on the impaling means carried by said conveyor, a ram for impaling the articles on the said impaling means carried by said conveyor, said ram and article support being normally out of the path of movement of said conveyor and movable into said path by conveyor movement.

21. A machine of the character described, comprising an article conveyor, a plurality of spaced article impaling means on said conveyor, a spray station, an article support on which an article rests prior to being impaled on the impaling means carried by said conveyor, and a ram for impaling the articles on the said impaling means carried by said conveyor, said ram and article support being normally out of the path of movement of said conveyor and movable as a unit into said path by conveyor movement.

22. A machine of the character described, comprising an article conveyor, a plurality of spaced article impaling means on said conveyor, a spray station, an article support on which an article rests prior to being impaled on the impaling means carried by said conveyor, a ram for impaling the article on the said impaling means carried by said conveyor, said ram and article support being normally out of the path of movement of the path of said conveyor and movable into said path by conveyor movement, and means for moving said article support out of supporting relation with the article after said article is impaled on said impaling means.

23. A machine of the character described, comprising an article conveyor, a plurality of spaced article impaling means on said conveyor, a spray station, an article support on which an article rests prior to being impaled on the impaling means carried by said conveyor, a ram for impaling the articles on the said impaling means carried by said conveyor, and means for moving said article support out of supporting relation with the articles after said article is impaled on said impaling means.

24. A machine of the character described, comprising an article conveyor, a spray device controlled by movement of said article conveyor for coating articles carried by said conveyor, an article loading mechanism adapted to place the articles on said conveyor, and means associated with said article loading mechanism for rendering said article conveyor inoperative as a spray device control means when no article is placed on said conveyor by said loading mechanism.

25. A machine of the character described, comprising an article conveyor, a spray device controlled by movement of said article conveyor for coating articles carried by said conveyor, an article loading mechanism adapted to place the articles on said conveyor, and means associated with and controlled by the operation of said article loading mechanism for rendering said article conveyor inoperative as a spray device control means when no article is placed on said conveyor by said loading mechanism.

26. A machine of the character described, comprising an article conveyor, a spray device controlled by movement of said article conveyor for coating articles carried by said conveyor, an article loading mechanism adapted to place the articles on said conveyor, and an article discharging mechanism controlled by operation of said loading mechanism for removing articles from said conveyor after coating.

27. A machine of the character described, comprising an endless article conveyor, a spray device controlled by movement of said conveyor for coating articles carried by said conveyor, an article loading mechanism in advance of said spray device adapted to place articles on said conveyor, a drying chamber through which said endless chain passes, and an article discharging mechanism disposed along said conveyor subsequently to said spray device and controlled by operation of said loading mechanism for removing articles from said conveyor after they have been coated and dried.

28. A machine of the character described, comprising an article conveyor, a plurality of spaced article carrying means on said conveyor, a means for loading articles on the impaling means carried by said conveyor, a spray station at which the articles are coated, and a treating chamber through which the coated articles pass, said treating chamber including an unheated zone into which the articles pass directly after coating, and a heated drying zone.

29. A machine of the character described, comprising an article conveyor, a plurality of spaced article carrying means on said conveyor, a means for loading articles on the impaling means carried by said conveyor, a spray station at which the articles are coated, and a treating chamber through which the coated articles pass, said treating chamber including an unheated zone into which the articles pass directly after coating, and a heated drying zone, and means for removing articles from said conveyor after they have passed through said treating chamber.

30. A machine of the character described, comprising an article conveyor, a plurality of spaced article carrying means on said conveyor, means for loading articles on said conveyor, a spray station at which the articles carried by the conveyor are treated, and means for removing treated articles from said conveyor including an arm having a decelerated motion working stroke.

31. A machine of the character described, comprising an article conveyor, a plurality of spaced article carrying means on said conveyor, means for loading articles on said conveyor, a spray station at which the articles carried by the conveyor are treated, means for removing treated articles from said conveyor including an ejecting means which engages each article at more than one point, and equalizing means acting to produce a uniform ejecting force at all points of contact of the ejecting means with the article whereby articles removed from the conveyor are deposited within a limited area.

32. A machine of the character described, comprising an article conveyor, a plurality of spaced article impaling means on said conveyor, an article loading mechanism for loading articles on said conveyor, a spray station at which the articles carried by the conveyor are treated, and means for removing treated articles from said conveyor including an ejecting means which engages each article at more than one point, and equalizing means acting to produce a uniform ejecting force at all points of contact of the ejecting means with the article whereby articles removed from the conveyor are deposited within a limited area, said ejecting means acting in timed relation with said loading mechanism.

33. A machine of the character described, comprising an article conveyor, a plurality of spaced article impaling means on said conveyor, an article loading mechanism for loading articles on said conveyor, a spray station at which the articles carried by the conveyor are treated, and means for removing treated articles from said conveyor including an ejecting means which engages each article at more than one point, and equalizing means acting to produce a uniform ejecting force at all points of contact of the ejecting means with the article whereby articles removed from the conveyor are deposited within a limited area, said ejecting means being controlled by the operation of and acting in timed relation with said loading mechanism.

34. A machine of the character described, comprising an article conveyor, article carrying means on said conveyor, electrical means for actuating said conveyor, a spray station past which the articles on said conveyor are carried for treatment, a loading device for loading the articles on the article carrying means on said conveyor, fluid pressure means for operating said loading device, and means for rendering said electrical means inoperative as a conveyor actuating means should the fluid pressure means become ineffective as a loading device operating means.

35. A machine of the character described, comprising an article conveyor, a plurality of article carrying means on said conveyor, a power source for actuating said conveyor, a spray station past which the articles on said conveyor are carried for treatment, a loading device for loading articles on the article carrying means on said conveyor, a power source for operating said loading device, and means for rendering said first named power source inoperative should said second named power source become ineffective to operate said loading device.

36. A machine of the character described, comprising an article conveyor, a power source for actuating said conveyor, a fluid pressure operated spray device for coating articles carried by said conveyor, and means for rendering said fluid pressure operating means for said spray device inoperative when the power source for actuating said conveyor is cut off.

AUGUSTUS M. SOSA.